United States Patent [19]
Williamson

[11] Patent Number: 4,958,584
[45] Date of Patent: Sep. 25, 1990

[54] AMPHIBIOUS VEHICLE HAVING AN EFFICIENT WATER-BORNE OPERATIONAL MODE

[75] Inventor: Roger L. Williamson, San Antonio, Tex.

[73] Assignee: MPV, Inc., San Antonio, Tex.

[21] Appl. No.: 310,207

[22] Filed: Feb. 9, 1989

Related U.S. Application Data

[63] Continuation-in-part of Ser. No. 127,800, Dec. 2, 1987, Pat. No. 4,838,194.

[51] Int. Cl.⁵ ............................................... B60F 3/00
[52] U.S. Cl. .................................... 114/270; 280/704; 280/840
[58] Field of Search ................... 114/270, 344; 440/41; 280/43.14, 43.16, 704, 840

[56] References Cited

U.S. PATENT DOCUMENTS

| | | | |
|---|---|---|---|
| 3,280,785 | 10/1966 | Mycroft | 114/270 |
| 3,421,472 | 1/1969 | Oberg | 114/270 |
| 3,756,185 | 9/1973 | Breslin | 440/41 X |
| 3,903,831 | 9/1975 | Bartlett et al. | 180/68.1 X |
| 4,241,686 | 12/1980 | Westphalen | 114/270 X |

Primary Examiner—Sherman D. Basinger
Attorney, Agent, or Firm—Gunn, Lee & Miller

[57] ABSTRACT

An amphibious vehicle having retractable wheels and sliding hull sections. A novel suspension system is disclosed for raising and lowering the wheels on the vehicle. A coil spring/shock absorber is connected to a linkage which moves horizontally by action of a motor and worm gear coupled to the linkage. The lateral movement of the linkage results in vertical movement of the wheel. The amphibious vehicle may be driven directly into the water, and the wheels raised. Sliding hull sections are then positioned over the wheel wells to give the vehicle a streamline outer hull for water-borne travel.

16 Claims, 5 Drawing Sheets

AMPHIBIOUS VEHICLE HAVING AN EFFICIENT WATER-BORNE OPERATIONAL MODE

CROSS-REFERENCE TO RELATED APPLICATION

This application is a Continuation-in-Part of co-pending application Ser. No. 127,800 entitled "Amphibious Vehicle Having an Efficient Water-Borne Operational Mode," filed Dec. 2, 1987 now U.S. Pat. No. 4,838,194.

BACKGROUND OF THE INVENTION

1. Field of the Invention

The present invention generally relates to transportation vehicles, such as cars and boats, and more particularly to an amphibious vehicle having retractable wheels and sliding hull sections.

2. Description of the Prior Art

Numerous examples of amphibious vehicles are known in the prior art. The term "amphibious vehicles" is generally used to describe vehicles which may operate on land, such as automobiles, but which may also be used for water-borne travel. Most of the prior art vehicles are crude, and often bizarre, adaptions of normally land-bound vehicles. Several patents disclose such devices, among them U.S. Pat. Nos. 2,979,016 issued to S. Rossi; 3,382,836 issued to M. Hume; 3,486,477 issued to D. Pender; and 3,933,112 issued to S. Veazey.

Other devices are specially designed for amphibious locomotion, as opposed to mere conversion of an automobile. Examples may be found in U.S. Pat. Nos. 2,399,141 issued to J. Quinn; 3,741,146 issued to C. Durrell, Jr; and Japanese Pat. No. 61-285107 issued to S. Yamamoto. Finally, amphibious vehicles other than cars are also known, such as U.S. Pat. Nos. 3,359,937 issued to R. D'Arena (motorcycle) and 3,987,747 issued to B. Locher (bicycle).

One major problem with these prior art devices is their poor performance characteristics in their water-borne mode. This is typically due to constraints placed on their construction by the need to adapt a vehicle designed only for land-bound travel to a secondary mode of operation. One vehicle that has overcome this deficiency is disclosed in copending application Ser. No. 127,800, of which this Application is a Continuation-in-Part. This device incorporated four fender/sponsons which rotate about each of the tires to enhance the stremlined nature of the vehicle. These improvements, however, led to other engineering problems which are overcome only by complicated (and costly) structural support features. Specifically, the fender/sponson arrangement further required a special gear system, an unusual plate arrangement to seal off the wheel wells, and a locking system for holding the sponsons in place. It would, therefore, be desirable and advantageous to devise an improved, simplified amphibious vehicle which simplified the supplanting of the tires with a more streamlined structure.

SUMMARY OF THE INVENTION

Accordingly, the primary object of the present invention is to provide a vehicle for land- or water-borne transportation.

Another object of the invention is to provide such a vehicle which has a streamlined body for water travel.

Still another object of the invention is to provide an amphibious vehicle having simplified structure for retracting the tires and covering them with hull sections.

The foregoing objects are achieved in an amphibious vehicle having sliding hull sections on either side. A special linkage is provided from the drive shaft to the wheels, with the additional provision of a screw type coupler for raising and lowering the wheels.

BRIEF DESCRIPTION OF THE DRAWINGS

The novel features believed characteristic of the invention are set forth in the appended claims. The invention itself, as well as a preferred mode of use, further objects and advantages thereof, will best be understood by reference to the following detailed description of illustrative embodiments when read in conjunction with the accompanying drawings, wherein:

DESCRIPTION OF THE PREFERRED EMBODIMENTS

Figure 1A:
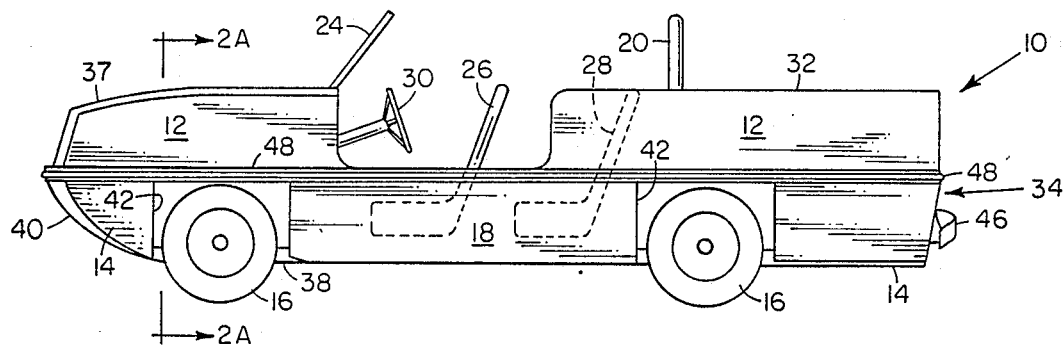
FIGS. 1A-1D are left side elevational views of the amphibious vehicle of the present invention depicting the retraction of the wheels and movement of the sliding hull sections.

The specification of co-pending application Ser. No. 127,800 entitled "Amphibious Vehicle Having an Efficient Water-Borne Operational Mode" filed Dec. 2, 1987, is incorporated herein by reference.

With reference now to the figures, and in particular with reference to FIGS. 1A-1D, there is depicted an amphibious vehicle 10. Elements of amphibious vehicle 10 which are visible in these figures include upper body 12, lower body 14, wheels 16, and left sliding hull section 18.

Upper body 12 is an integral unit, formed from conventional fiberglass molding techniques. Since vehicle 10 is designed for water sports, upper body 12 is preferably a "convertible" style with no roof. Of course, any number of alternative roof styles could be provided, such as a standard hard top, T-top, etc. At retractable cloth roof may be furnished with the convertible style. Holes are placed in upper body 12 for passage of roll bar 20 which is attached to the chassis or frame 22 of vehicle 10 (shown in FIGS. 2A, 2B, 3, and 5).

A windshield 24 is attached to upper body 12, and the interior portion of upper body 12 includes front and rear seats 26 and 28 steering wheel 30, as well as other standard automobile instrumentationl not shown. A removable panel (not shown) may be placed on the upper surface 32 of upper body 12 of vehicle 10 for access to the engine. A similar panel may be provided in the front section 37 of upper body 12 for access to a convenient storage area or trunk, or to allow access to the components of the front suspension system.

Lower body 14 is also formed of an integral piece of molded fiberglass. The lower surface 36 of lower body 14 (shown more clearly in FIG. 5) is of a tri-hull shape for fluid motion, as well as stability, in water. The leading edge 40 is also contoured to provide minimum resistance to fluid flow. Four wheel wells 42 are molded into the shape of lower body 14 and sized to accommodate wheels 16. Wheel wells 42 have appropriate cutouts for the suspension system (discussed further below). A hole 44 (shown in FIG. 5) is cut out of lower body 14 at rear end 34 of vehicle 10 to allow passage of jet exhaust 46. Upper and lower bodies 12 and 14 meet at seam 48, made into a watertight seal by any convenient means, such as epoxy resin or silicon sealant.

Figure 1B:
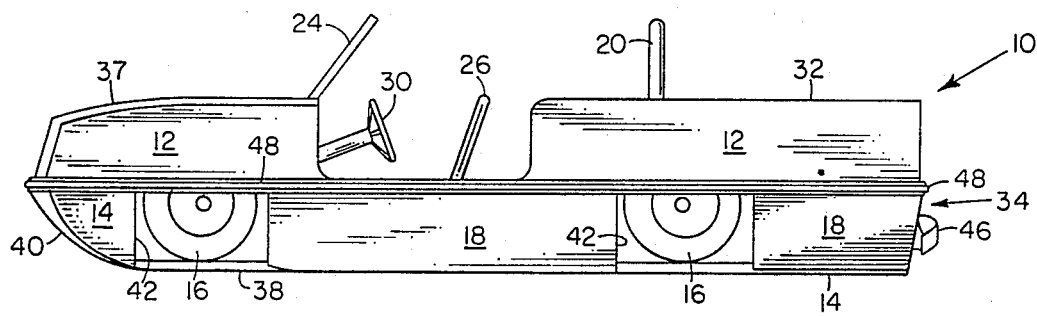

FIGS. 1A through 1D depict the metamorphosis of vehicle 10 from a landbound automobile to a waterborne craft. In FIG. 1A, vehicle 10 is shown with wheels 16 in their lowered position for normal driving. The vehicle is driven in this state directly into the water, for example, from a boat launch. Next, the wheels are raised by the retraction mechanism discussed below. FIG. 1B shows the wheels raised, but still exposed. Then the hull sections are made to slide over wheel wells 42.

Figure 1C:
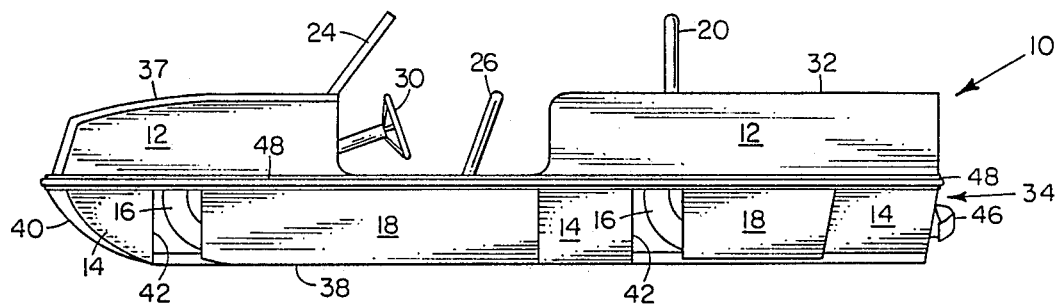
Figure 1D:
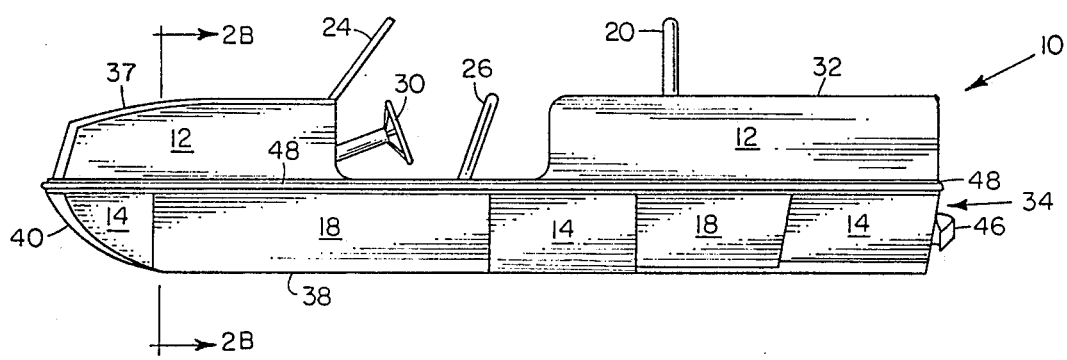
Figure 4:
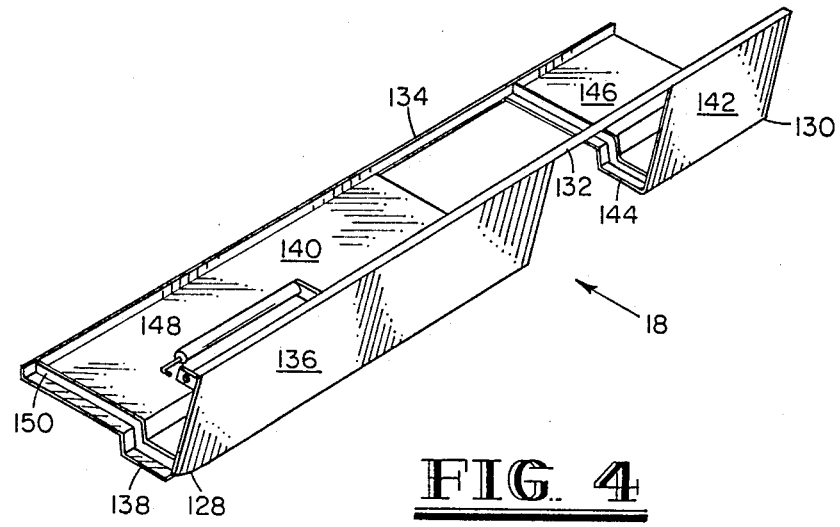
FIG. 4 is a perspective view of the left sliding hull section.

Left sliding hull section 18 lies adjacent the left side of lower body 14, and is described in greater detail below in conjunction with FIG. 4, FIG. 1C illustrates left sliding hull section 18 in an intermediate position as it slides over wheel wells 42. Finally, when left sliding hull section 18 has completely covered wheel wells 42, vehicle 10 achieves the appearance of a boat as shown in FIG. 1D. Although FIGS. 1A-1D depict only the left side of vehicle 10, it is to be understood that the craft is basically symmetrical and a right sliding hull section 19 (being a mirror image of left sliding hull section 18, as shown in FIGS. 2A and 2B) would cover the wheel wells on the right side of vehicle 10.

Figure 2A:
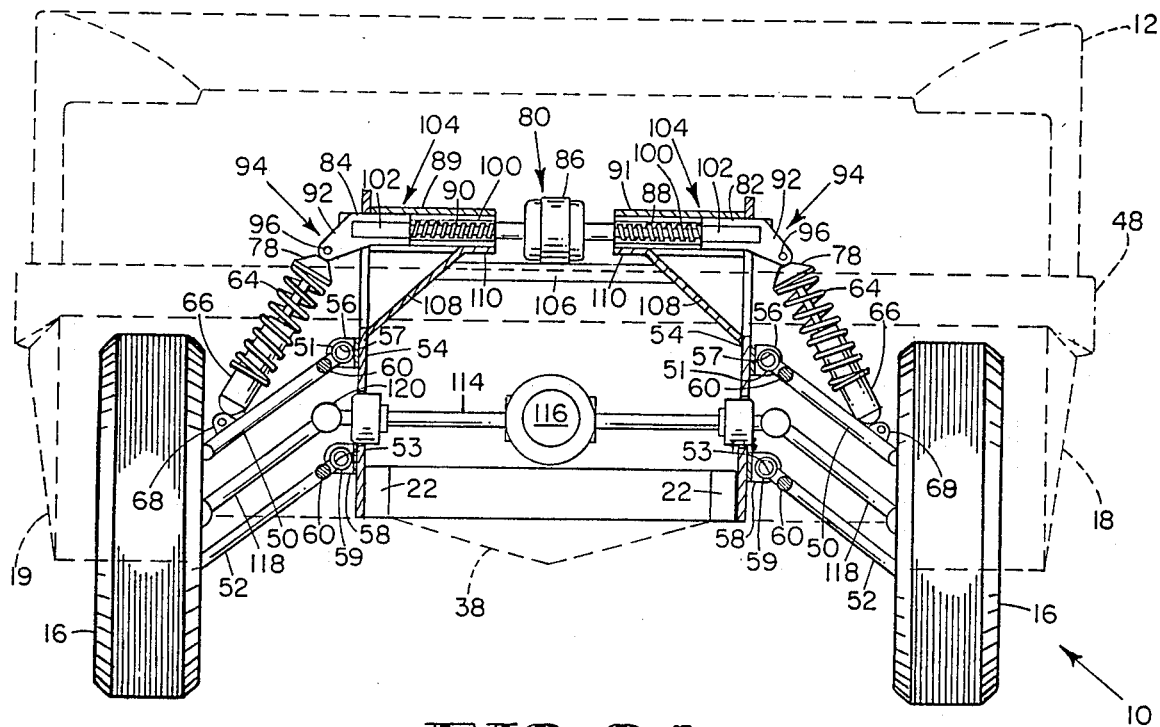
FIGS. 2A and 2B are front elevational cross-sections of the wheel retraction mechanism taken along lines 2A—2A of FIG. 1A and lines 2B-2B of FIG. 1D, with the body of the vehicle shown in ghost lines.
Figure 2B:
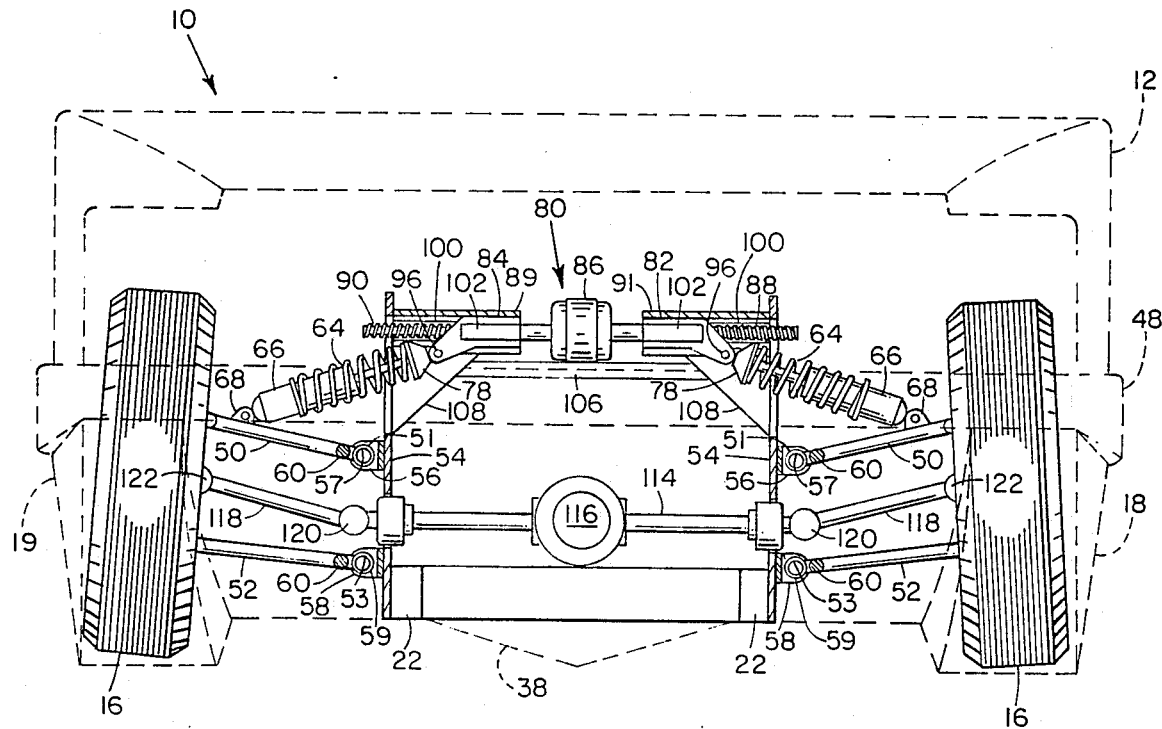
Figure 3:
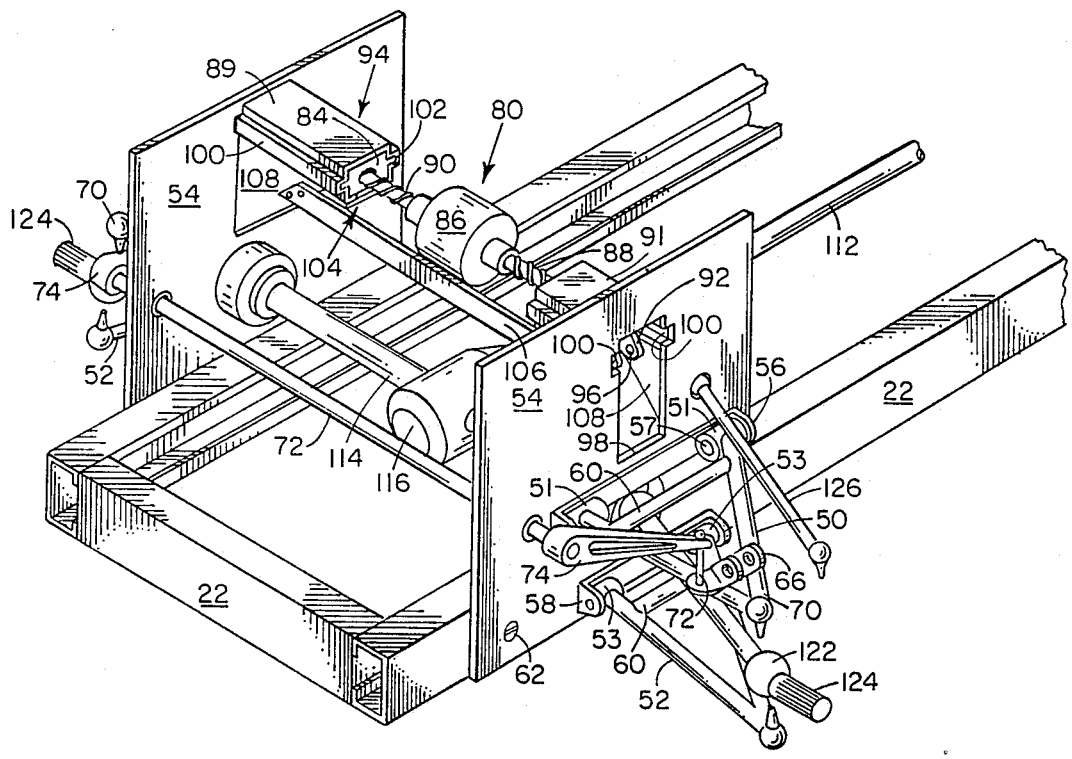
FIG. 3 is a perspective view showing the interrelationship of the wheel retraction mechanism and the suspension as attached to the frame of the amphibious vehicle.
Figure 3A:
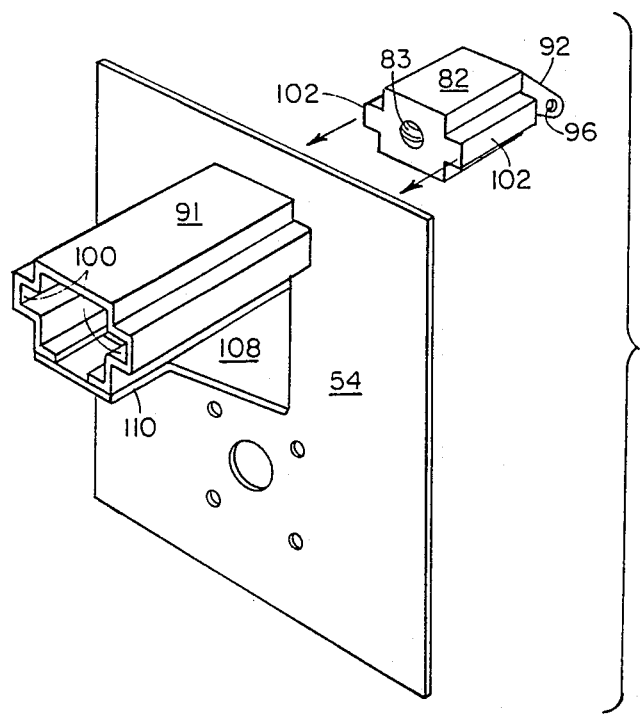
FIG. 3A is an exploded perspective view showing the interrelationship between the linkages and linkage housing.
Figure 5:
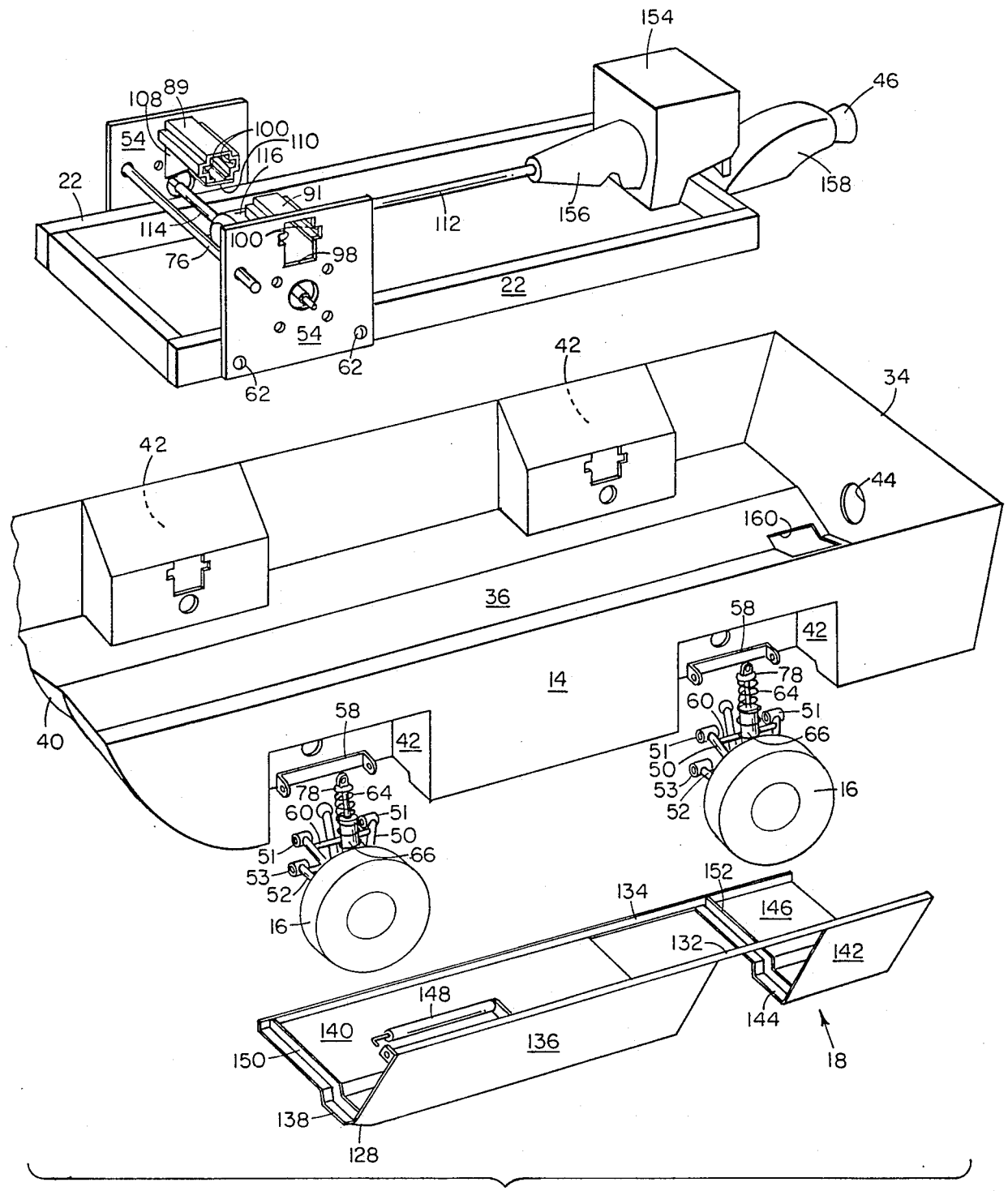
FIG. 5 is an exploded perspective view of the left sliding hull section, wheels and suspension, body, and frame of the amphibious vehicle.

The mechanism for retracting wheels 16 and the general suspension system for vehicle 10 are pictured in FIGS. 2A and 2B, as well as FIGS. 3, 3A, and 5. FIG. 2A shows wheels 16 in their lowered position while FIG. 2B shows wheels 16 raised and encased in wheel wells 42 by left and right sliding hull sections 18 and 19. FIG. 3 is a perspective view with the wheels removed for clarity.

In the preferred embodiment, the suspension consists of upper and lower A-arms 50 and 52, defining what is commonly known as a twin wishbone suspension. Upper and lower A-arms 50 and 52 are attached to steel mounting plates 54 by means of upper and lower mounting brackets 56 and 58. Specifically, upper and lower A-arms 50 and 52 each terminate in a pair of roller bearings 51 and 53, respectively, which mate with bearings 57 and 59, integral with mounting brackets 56 and 58, respectively. Each of the A-arms has integral therewith a stiffener 60. Mounting plates 54, in turn, are mounted to frame 22 by any conventional means, such as bolts 62, or may be integral therewith.

The suspension for vehicle 10 also includes conventional coil springs 64 and shock abosorbers 66. Coil springs 64 and shock absorbers 66 are attached to upper A-arms 50 by means of couplers 68, which are fixed to the distal end 70 of upper A-arms 50. Couplers 68 further consist of pins 72 for receiving arms 74 of anti-sway bar 76. Coil springs 64 and shock absorbers 66 are attached at their common upper ends 78 to linkages 82 and 84 of retraction mechanism 80.

The novelty of this supension system lies in retraction mechanism 80 which essentially consists of linkages 82 and 84, motor 86, worm gears 88 and 90, and linkage housing 89 and 91. Linkages 82 and 84 are constructed of a durable, rigid material, such as steel, and are basically rectangular in shape, having two ears 92 at the distal end 94 thereof. Each ear 92 has a hole 96 therein for receiving a pin (not shown) from upper end 78 of coil spring/shock absorber 64/66. Linkages 82 and 84 fit slidably within linkage housing 89 and 91 which are integral with mounting plates 54 and are braced thereto by supports 108 and 110. Linkage housing 89 and 91 have mortise portions 100 for receiving tenons 102 of linkages 82 and 84 as they pass slidably along the inside surface of linkage housings 89 an 91.

The proximate ends 104 of linkages 82 and 84 have threaded apertures 83 (visible in FIG. 3A) for receiving worm gears 88 and 90. Worm gears 88 and 90 are rotatably coupled to motor 86 such that, when motor 86 is energized corresponding to retraction of the wheels for water travel), worm gears 88 and 90 rotate, pulling linkages 82 and 84 inward toward motor 86 along their respective linkage housings 89 and 91. Coil springs 64 and shock absorbers 66 are thereby forced upward, further raising wheels 16. When vehicle 10 is to be brought back onto land, motor 86 is energized in the reverse direction, pushing linkages 82 and 84 outward along their respective linkage housings 89 and 91, forcing coil springs 64 and shock absorbers 66 downward, lowering wheels 16.

In order to simplify the internal gear structure of motor 86, worm gears 88 and 90 are mirror images, i.e., one is threaded like a right-handed screw, while the other has left-handed threads. The apertures within linkages 82 and 84 are likewise oppositely threaded. In this manner, rotation of worm gears 88 and 90 in the same angular direction results in opposing action of linkages 82 and 84. Motor 86 is preferably hydraulic in nature, but alternatively may be electrical.

Motor 86 is mounted on a cross-brace 106 which is attached to mounting plates 54 at either end by supports 108. Supports 108 and cross-brace 106 further help brace mounting plates 54 and add structural integrity to frame 22. Supports 108 are integral with plates 54 and housing linkages 89 and 91 to insure proper alignment of linkages 82 and 84.

Of course, retraction mechanism 80 has wider applications. For example, it may be used on all terrain vehicles for adjusting the height of the vehicle, i.e., providing lower center of gravity for highway driving, then raising the axle height for off-road conditions.

It is anticipated that vehicle 10 will be front wheel drive. Accordingly, a drive shaft 112 extends from the rear of vehicle 10, connecting to axle 114 via differential 116. Axle 114 passes through mounting plate 54, and is connected to a secondary axle member 118 by a constant velocity joint 120. A second constant velocity joint 122 connects secondary axle member 118 to spline 124 which in turn fits into wheel 16. The suspension system for the front wheels also includes steering arms 126. All holes in mounting plate 54 are appropriately sealed to prevent the entry of water. Additionally, protection from water ingress is provided by sealing means on hull sections 18 and 19 as described below.

With reference now to FIG. 4, the left sliding hull section 18 is depicted. Each of the sliding hull sections 18 and 19 are essentially composed of two portions, front hull section 128 and rear hull section 130. Each of these elements may be constructed of the same fiberglass material as upper and lower bodies 12 and 14 or, alternatively, front and rear hull sections 128 and 130 may be made of a more durable material, such as epoxy resins or even metal. Front and rear hull sections 128 and 130 are contoured to fit snugly against the sides of lower body 14, front hull section 128 having side, bottom, and recessed portions 136, 138, and 140, and rear hull section 130 having similar side, bottom, and recessed portions 142, 144, and 146.

Front and rear hull sections 128 and 130 are joined by upper and lower beams 132 and 134. Upper beam 132 rests between upper body 12 and lower body 14 along seam 48. To facilitate the sliding action of hull sections 18 and 19, upper beam 132 may be coated with friction-free material such as TEFLON (a trademark for polytetrafluoroethylene), or it may ride upon bearings (not shown). Lower beam 134 could similarly be mounted on bearings surfaces attached to lower surface 38 of lower body 14.

The movement of hull sections 18 and 19 is controlled by an actuation mechanism 148. In the preferred embodiment, actuation mechanism 148 is a double action hydraulic cylinder, with one end attached to hull section 18 and the other attached to lower body 14, but several alternative mechanisms are available, such as a rack and pinion or other gear assemblies. The leading edges of front and rear hull sections 128 and 130 also have sealing faces 150 and 152 along their inner surfaces which abut the inside of wheel wells 42 to prevent water from entering the interior of vehicle 10 during water-borne operation. The trailing edge of front and rear hull sections 128 and 130 may have ports whereby, when the vehicle has reached sufficiently high waterborne speed, any water in wheel wells 42 is evacuated due to Bernoulli's principle. In the alternative, front and rear hull sections 128 and 130 may nest, one inside the other, when in a retracted position. Activation mechanisms 148 would then operate to move hull sections 128 and 130 between a retracted position to an extended position covering wheel wells 42.

FIG. 5 shows certain features of vehicle 10 not previously described. Specifically, drive shaft 112 is coupled to a conventional internal combustion engine 154 and bell housing 156. Engine 154 is further coupled to a jet drive 158, overlying a hole 160 in lower surface 36 of lower body 14, for water intake into jet drive 158. Jet drives are known in the art, and the preferred embodiment would incorporate what is known as a marine mini-jet, such as that produced by Berkely Marine under the Model number 6J Attention is directed to the parent application for further information on devices for propelling and steering vehicle 10 during the water-borne travel.

Figure 6:
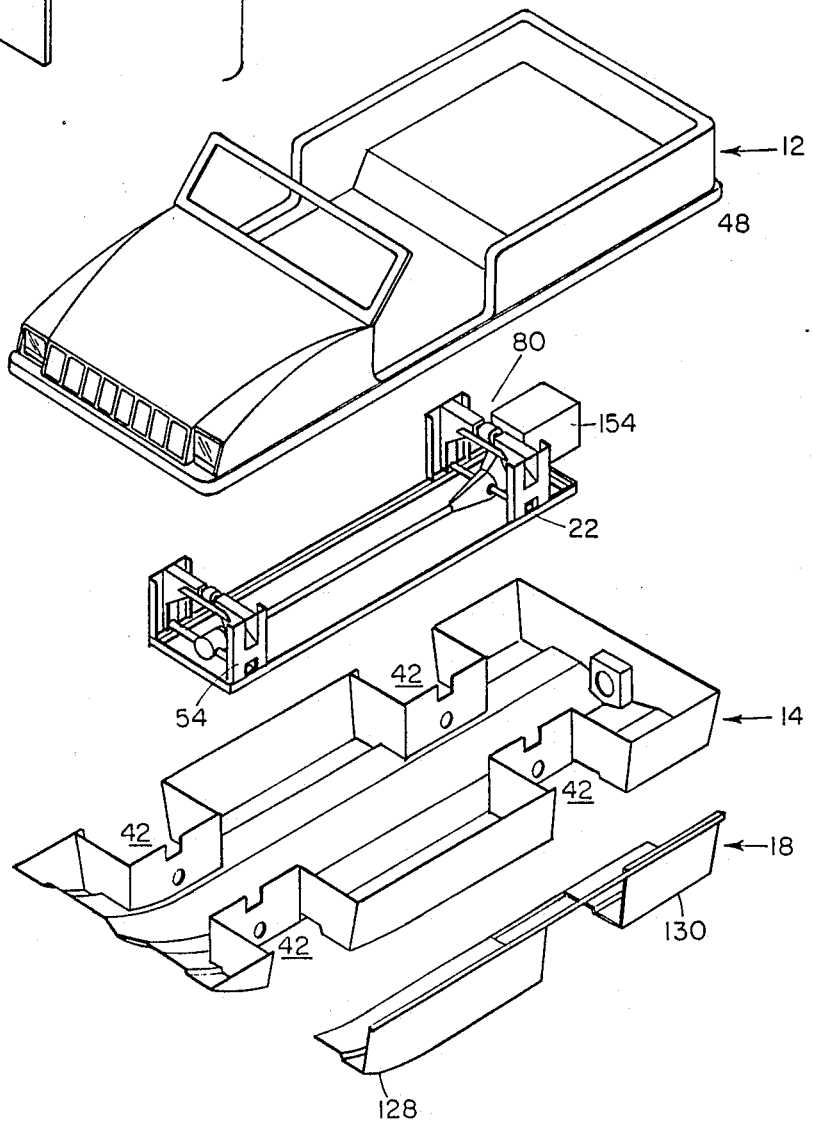
FIG. 6 is another exploded perspective showing the interrelationship of the sliding hull section, lower body, upper body, and frame.

FIG. 6 illustrates the simplicity of manufacturing and assembly of vehicle 10. Frame 22 is secured into lower body 14 by conventional fasteners. Integral with the frame 22 are engine 154 and drive train components associated therewith, and mounting plates 54. Also in place on frame 22 is retraction mechanism 80. Next, upper body 12 is fitted and sealed to lower body 14 at seam 48 with a suitable seal. Suspension components and wheels 16 may then be attached. Last, hull sections 18 and 19 are fitted.

Operation of vehicle 10 is also very simple. In the land-bound mode, vehicle 10 is taken to any boat landing and driven directly into the water. Wheels 16 are retracted by energizing motor 86, and left and right sliding hull section's 18 and 19 are moved to their closed position over wheel wells 42 by activating actuation mechanisms 148. Engine 154 is engaged to jet drive 158, and the vehicle 10 is ready for water-borne travel. In the alternative, jet drive 158 may be replaced with an inboard-outboard drive such as the outdrive system manufactured by OMC of Waukegan, Ill., or Mercury Stern-drive, manufactured by Brunswick, Fond-du-lac, Wisconsin. These inboard-outboard drive units are connected by a clutch to the crankshaft or flywheel of engine 154. A computerized control circuit (not shown) may be provided to facilitate the change in vehicle 10 from car to boat, whereby the operator would merely depress a single button and each of the above steps would automatically occur.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description of the invention. For example, vehicle 10 may be equipped with the many standard features on automobiles, such as air-conditioning, radio-cassette players, instrument gauges, etc. Furthermore, vehicle 10 has a much wider application than merely for recreational purposes; the invention disclosed herein could be adapted for use as a military landing craft, armored personnel carrier, barge, trailer, or even motor home. It is therefore contemplated that the appended claims will cover such modifications that fall within the true scope of the invention.

What is claimed is:

1. An amphibious vehicle comprising:
   a body having an interior portion and wheel wells;
   at least three wheels located within said wheel wells;
   suspension means for attaching said wheels to said body, each wheel
   having one of said suspension means wherein said suspension means comprises:
   at least one support member having first and second ends, said first end being pivotally mounted to said body, and said second end being pivotally mounted to one of said wheels;
   a shock absorber member having first and second ends, said first end of said shock absorber member being attached to said second end of said support member, and said second end of said shock absorber member being attached to a retraction means.
   means for steering said wheels;
   engine/transmission means for impelling at least one of said wheels;
   means for retracting said wheels from a lowered position to a raised position, and for lowering said wheels from said raised position to said lowered position wherein said retraction means comprises:
   a linkage member having first and second ends, said first end of said linkage member being attached to said second end of said shock absorber member;
   means for imparting horizontal motion to said linkage member, said second end of said linkage member being attached to said imparting means, whereby lateral movement of said linkage member causes said shock absorber member to raise said support member, which in turn raises said wheel, wherein said linkage member has a threaded aperture at said second end, and said means for imparting horizontal motion to said linkage member comprises:
  a worm gear having first and second ends, said first end being inserted into said threaded aperture of said linkage member;
  a motor, rotatably coupled to said second end of said worm gear, whereby energization of said motor causes said worm gear to rotate, said rotation force being converted to translational force by the action of said first end of said worm gear in said threaded aperture of said linkage member;
hull means for covering said wheel wells when said wheels are in said raised position, wherein said hull means comprises:
  a front hull section;
  a rear hull section; wherein said front and rear hull sections each have means for sealing said wheel wells, thereby substantially preventing water from entering said wheel wells;
  means for connecting said front and rear hull sections, said front and rear hull sections being slidably attached to said side of said body whereby, when said front and rear hull sections are in a first position, said wheel wells are exposed and said wheels may contact a supporting roadway and, when said front and rear hull sections are in a second position, corresponding to said raised position of said wheels, said front and rear hull sections cover said wheel wells;
  means for moving said front and rear hull sections between said first and second positions wherein said means for moving said front and rear hull sections comprises a double action hydraulic cylinder;
a plurality of linkage housings, each integral with a vertical mounting plate attached to said body, one of said linkage housings for each of said wheels, said linkage member having a rectangular cross-section, said linkage housing further having a rectangular cross-section therein for passage of said linkage member therethrough, said linkage housing providing support of and a track for said linkage member; and
means for propelling the vehicle in water.

2. An amphibious vehicle comprising:
a body having an interior portion, a left side, and a right side, and four wheel wells, two on each of said sides;
a frame attached to and located within said interior of said body;
four vertical mounting plates attached to said frame, each proximate one of said wheel wells on said body;
four wheels, one each located at said wheel wells;
a plurality of A-arms, at least one at each of said wheels, each A-arm having a proximate end and a distal end, said proximate end being pivotally attached to one of said mounting plates, and said distal end being pivotally attached to one of said wheels;
four shock absorber members, one at each wheel, each having first and second ends, said first end being pivotally attached to said distal end of one of said A-arms;
a plurality of retraction mechanisms for raising said wheels from a lowered position to a raised position, and for lowering said wheels from said raised position to said lowered position; said second ends of said shock absorber members being attached to one of said plurality of retraction mechanisms wherein each of said retraction mechanisms comprises:
  a linkage housing having a substantially rectangular cross-section and integral with said mounting plate;
  a linkage member having a rectangular cross-section, and further having first and second ends, said first end of said linkage mebmer being attached to said second end of one of said shock absorber members, said linkage member sized to pass through said rectangular linkage housing;
  means for imparting horizontal motion to said linkage member, said second end of said linkage member being attached to said imparting means, whereby lateral movement of said linkage member through said linkage housing causes one of said shock absorber members to raise one of said support members, which in turn raises one of said wheels;
hull means for covering said wheel wells when said wheels are in said raised position;
means for steering said wheels;
engine/transmission means for impelling at least one of said wheels; and
means for propelling the vehicle in water.

3. The amphibious vehicle of claim 2 wherein said linkage member has a threaded aperture at said second end, and said means for imparting horizontal motion to said linkage member comprises:
  a worm gear having first and second ends, said first end being inserted into said threaded aperture of said linkage member; and
  a motor rotatably coupled to said second end of said worm gear, whereby energization of said motor causes said worm gear to rotate, said rotation force being converted to translational force by the action of said first end of said worm gear in said threaded aperture of said linkage member, said motor being fixed to said frame.

4. The amphibious vehicle of claim 2, wherein said hull means comprises:
  a left front hull section;
  a left rear hull section;
  means for connecting said left front and rear hull sections, said left front and rear hull section being slidably attached to said left side of said body whereby, when said left front and rear hull sections are in a first position, said wheels wells on said left side of said body are exposed and said wheels on said left side of said body may contact a supporting roadway and, when said left front and rear hull sections are in a second position, corresponding to said raised position of said wheels, said left front and rear hull sections cover said wheel wells on said left side of said body;
  a right front hull section;
  a right rear hull section;
  means for connecting said right front and rear hull sections, said right front and rear hull sections being slidably attached to said right side of said body whereby, when said right front and rear hull sections are in a first position, said wheel wells on said right side of said body are exposed and said wheels on said right side of said body may contact a supporting roadway and, when said right front and rear hull sections are in a second position, corresponding to said raised position of said wheels, said right front and rear hull sections cover said wheel wells on said right side of said body; and means for moving said left front and rear hull sections and said right front and rear hull sections between said first and second positions.

5. The amphibious vehicle of claim 4 wherein said left and right, front and rear hull sections each have means for substantially sealing said wheel wells, thereby preventing water from entering said wheel wells, and wherein said means for moving said left and right, front and rear hull sections comprises two double action hydraulic cylinders.

6. An amphibious vehicle comprising:
a body having an interior portion, a left side, and a right side, and four wheel wells, two on each of said sides;
a frame attached to and located within said interior of said body;
four vertical mounting plates attached to said frame, each proximate one of said wheel wells on said body, and each having substantially rectangular linkage housing integral therewith;
four wheels, one each located within said wheel wells;
a plurality of A-arms, at least one at each of said wheels, each A-arm having a proximate end and a distal end, said proximate end being pivotally attached to one of said mounting plates, and said distal end being pivotally attached to one of said wheels;
four coil spring/shock absorber members, one at each wheel, each having first and second ends, said first end being pivotally attached to said distal end of one of A-arms;
for linkage members, each having a substantially rectangular cross-section, and further having first and second ends, each said first ends of said linkage members being attached to said second end of one of said coil spring/shock absorber members, said linkage members passing through said linkage housing of said mounting plates, and said linkage members each having a threaded aperture at said second end;
four worm gears having first and second ends, said first end of said worm gears being inserted into said threaded aperture of one of said linkage members;
motor means rotatably coupled to said second ends of said worm gears, whereby energization of said motor means causes said worm gears to rotate, said rotation force being converted to translational force by the action of said first ends of said worm gears in said threaded apertures of said linkage members, said motor means being fixed to said frame;
a left front hull section;
a left rear hull section;
means for connecting said left front and rear hull sections, said left front and rear hull sections being slidably attached to said left side of said body whereby, when said left front and rear hull sections are in a first position, said wheel wells on said left side of said body are exposed and said wheels on said left side of said body may contact a supporting roadway and, when said left front and rear hull sections are in a second position, corresponding to raised position of said wheels, said left front and rear hull sections cover said wheel wells on said left side of said body;
a right front hull section;
a right rear hull section;
means for connecting said right front and rear hull sections, said right front and rear hull sections being slidably attached to said right side of said body whereby, when said right front and rear hull sections are in a first position, said wheel wells on said right side of said body are exposed and said wheels on said right side of said body may contact a supporting roadway and, when said right front and rear hull sections are in a second position, corresponding to said raised position of said wheels, said front and rear hull sections cover said wheel wells on said right side of said body;
a first double action hydraulic cylinder coupled to said left front and rear hull sections, and a second double action hydraulic cylinder coupled to said right front and rear hull sections, for moving said left and right, front and rear hull sections and said right front and rear hull sections between said first and second positions;
means for sealing said left and right, front and rear hull sections with said wheel wells, thereby preventing water from entering said wheel wells;
means for evacuating water from said wheel wells during water-borne operation of the vehicle;
means for steering said wheels;
engine/transmission means for impelling at least one of said wheels; and
means for propelling the vehicle in water.

7. A suspension system for a wheel on a vehicle having at least three wheels and a frame, comprising:
at least one support member having first and second ends, said first end being pivotally mounted to said frame, and said second end being pivotally mounted to said wheel;
a shock absorber member having first and second ends, each first end of said shock absorber member being attached to said second end of said support member; and
means for retracting said wheel from a lowered position to a raised position and for lowering said wheel from said raised position to said lowered position, said second end of said shock absorber member being attached to said retraction means wherein said retraction means comprises:
a linkage member having first and second ends, said first end of said linkage member being attached to said second end of said shock absorber member wherein said linkage member has a rectangular cross-section and a threaded aperture at said second end;
a motor coupled to said second end of said linkage member for imparting horizontal motion to said linkage member, whereby lateral to raise said support member, which in turn raises said wheel further comprising:
a worm gear having first and second ends, said first end of said worm gear being inserted into said threaded aperture of said linkage member, and said second end of said worm gear being rotatably connected to said motor, whereby energization of said motor causes said worm gear to rotate, said rotation force being converted to translational force by the action of said first end of said worm gear in said threaded aperture of said linkage member, said translational force resulting in said lateral movement of said linkage member; and a vertical mounting plate attached to said frame, said first end of said support member being pivotally attached to said mounting plate, and said mounting plate further having a substantially rectangular linkage housing for receiving said linkage member therein, said rectangular linkage housing providing support of and a track for said linkage member when said linkage member undergoes said lateral movement.

8. An amphibious vehicle comprising:

a body having an interior portion, a front, side walls, a rear, a top portion and a bottom wherein said side walls and said bottom define at least three wheel wells therein;

frame means attached to and located within said interior of said body;

at least three wheels located within said at least three wheel wells;

suspension means for attaching said wheels to said frame means, each wheel having one of said suspension means;

means for steering said wheels;

engine/transmission means for impelling at least one of said wheels;

means for retracting said wheels from a lowered position to a raised position, and for lowering said wheels from said raised position to said lowered position;

a hull means having first and second sections joined together for unitary movement, said sections covering two of said wheel wells in their entirety when said wheels are in said raised position; and means for propelling the vehicle in water.

9. The amphibious vehicle of claim 8 wherein said suspension means comprises:

at least one support member having first and second ends, said first end being pivotally mounted to said frame means, and said second end being pivotally mounted to one of said wheels;

a shock absorber member having first and second ends, said first end of said shock absorber member being attached to said second end of said support member, and said second end of said shock absorber member being attached to said retraction means.

10. The amphibious vehicle of claim 9 wherein said retraction means comprises:

a linkage member having first and second ends, said first end of said linkage member being attached to said second end of said shock absorber member;

means for imparting horizontal motion to said linkage member, said second end of said linkage member being attached to said means, whereby lateral movement of said linkage member causes said shock absorber member to raise said support member, which in turn raises said wheel.

11. The amphibious vehicle of claim 10 wherein said linkage member has a threaded aperture at said second end, and said means for imparting horizontal motion to said linkage member comprises:

a worm gear having first and second ends, said first end being inserted into said threaded aperture of said linkage member; and a motor rotatably coupled to said second end of said worm gear, whereby energization of said motor causes said worm gear to rotate, said rotation force being converted to translational force by the action of said first end of said worm gear in said threaded aperture of said linkage member.

12. The amphibious vehicle of claim 11, having two of said wheel wells on one side of said body, wherein said hull means comprises:

a front hull section;

a rear hull section;

means for connecting said front and rear hull sections, said front and rear hull sections being slidably attached to said side of said body whereby, when said front and rear hull sections are in a first position, said wheel wells are exposed and said wheels may contact a supporting roadway and, when said front and rear hull sections are in a second position, corresponding to said raised position of said wheels, said front and rear hull sections cover said wheel wells; and means for moving said front and rear hull sections between said first and second positions.

13. The amphibious vehicle of claim 12 wherein said front and rear hull sections each have means for sealing said wheel wells; thereby substantially preventing water from entering said wheel wells.

14. The amphibious vehicle of claim 13 wherein said means for moving said front and rear hull sections comprises a double action hydraulic cylinder.

15. The amphibious vehicle of claim 14 further comprises a plurality of linkage housings, each integral with a vertical mounting plate attached to said frame, one of said linkage housings for each of said wheels, said linkage member having a rectangular cross-section, said linkage housing further having a rectangular cross-section therein for passage of said linkage member therethrough, said linkage housing providing support of and a track for said linkage member.

16. An amphibious vehicle comprising:

a body having an interior portion and at least three wheel wells;

frame means attached to and located within said interior of said body;

at least three wheels located within said at least three wheel wells;

suspension means for attaching said wheels to said frame means, each wheel having one of said suspension means, wherein said suspension means comprises:

at least one support member having first and second ends, said first end being pivotally mounted to said frame means, and said second end being pivotally mounted to one of said wheels;

a shock absorber member having first and second ends, said first end of said shock absorber member being attached to said second end of said support member, and said second end of said shock absorber member being attached to a retraction means.

means for steering and wheels;

engine/transmission means for impelling at least one of said wheels;

said retraction means retracting said wheels from a lowered position to a raised position and lowering said wheels from a raised position to said lowered position wherein said retraction means comprises:

a linkage member having first and second ends, said first end of said linkage member being attached to said second end of said shock absorber member;

means for imparting horizontal motion to said linkage member, said second end of said linkage member being attached to said imparting means, whereby lateral movement of said linkage member causes said shock absorber member to raise said support member, which in turn raises said wheel, wherein said linkage member has a threaded aperture at said second end, and said means for imparting horizontal motion to said linkage member comprises:

a worm gear having first and second ends, said first end being inserted into said threaded aperture of said linkage member; and a motor rotatably coupled to said second end of said worm gear, whereby energization of said motor causes said worm gear to rotate, said rotation force being converted to translational force by the action of said first end of said worm gear in said threaded aperture of said linkage member.

hull means for covering two of said wheel wells in their entirety when said wheels are in said raised position wherein said hull means comprises:

a front hull section;

a rear hull section;

means for connecting said front and rear hull sections for unitary movement said front and rear hull sections being slidably attached to said side of said body whereby, when said front and rear hull sections are in a first position, said wheel wells are exposed and said wheels may contact a supporting roadway and, when said front and rear hull sections are in a second position, corresponding to said raised position of said wheels, said front and rear hull sections cover said wheels wells; and means for moving said front and rear hull sections between said first and second positions means for propelling the vehicle in water.

* * * * *